C. S. TRAMELL.
HOLDER FOR LARD AND BUTTER TRAYS AND LIKE RECEPTACLES.
APPLICATION FILED APR. 9, 1914.
1,134,651.
Patented Apr. 6, 1915.
2 SHEETS—SHEET 2.
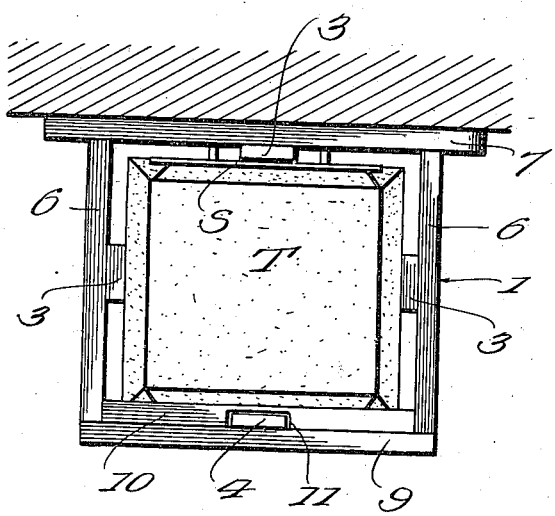
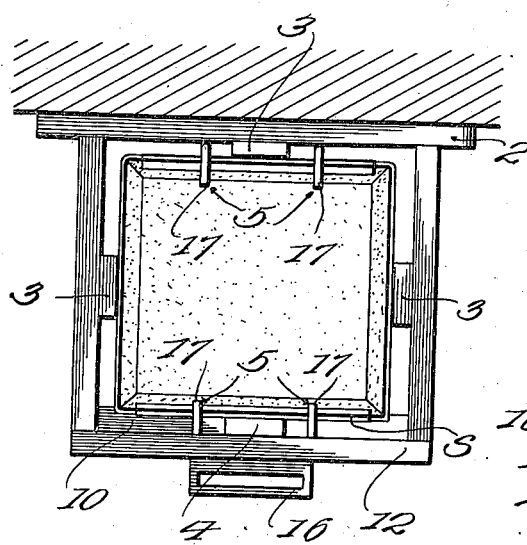
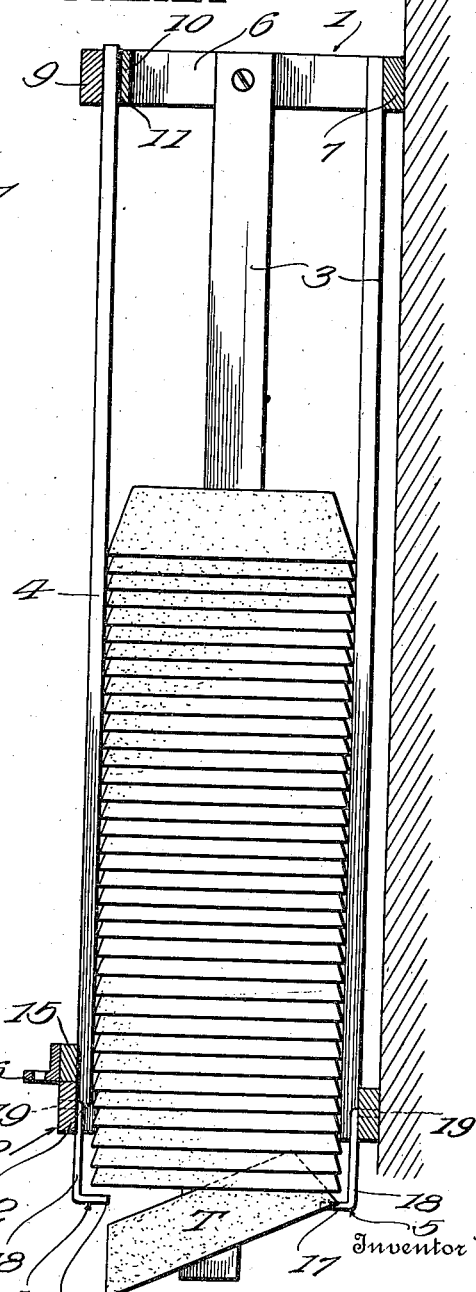

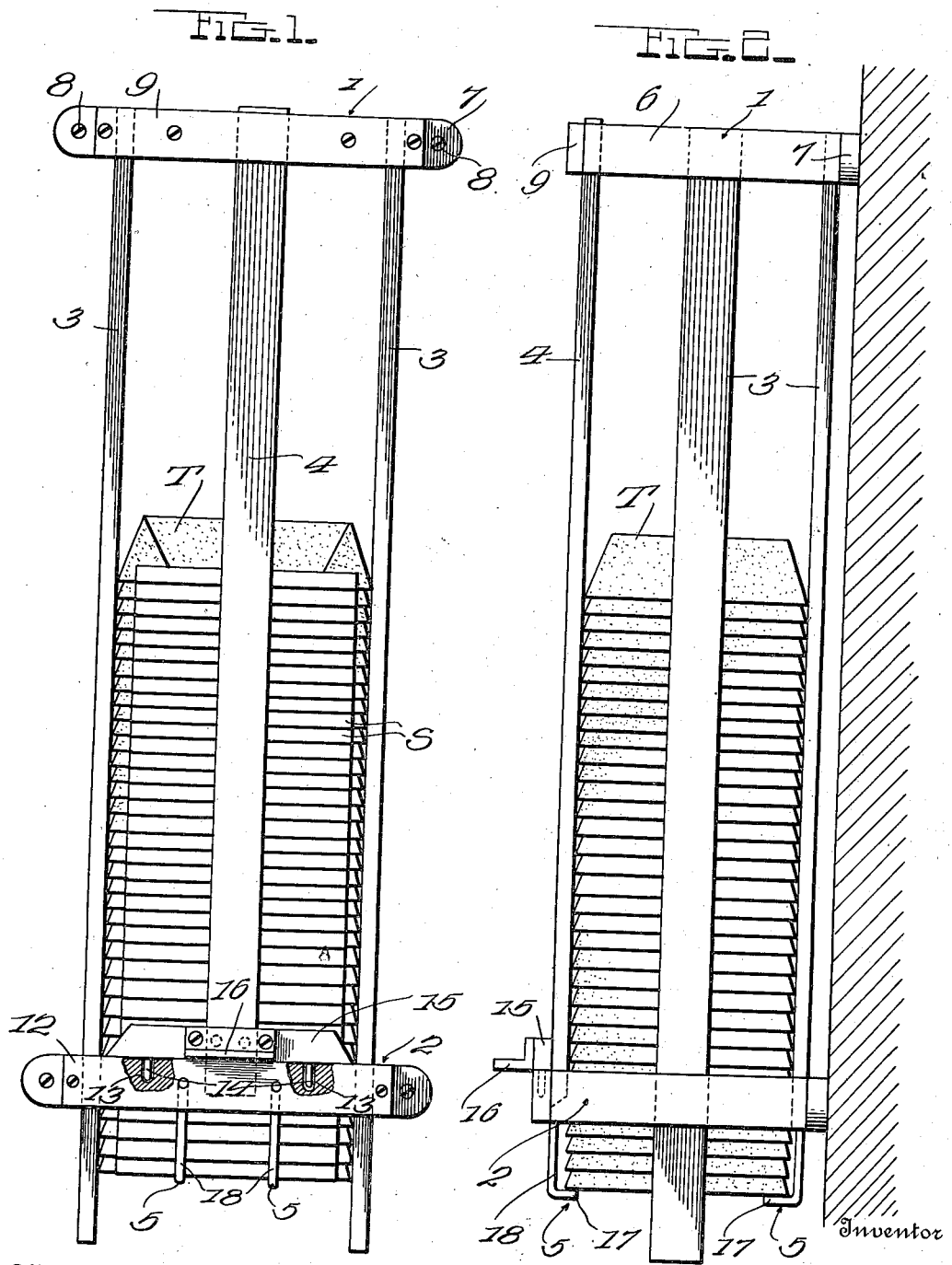

UNITED STATES PATENT OFFICE.

CHARLES S. TRAMELL, OF PRUDEN, TENNESSEE, ASSIGNOR OF ONE-HALF TO WALTER C. SEALE, OF PRUDEN, TENNESSEE.

HOLDER FOR LARD AND BUTTER TRAYS AND LIKE RECEPTACLES.

1,134,651.

Specification of Letters Patent.  Patented Apr. 6, 1915.

Application filed April 9, 1914. Serial No. 830,717.

*To all whom it may concern:*

Be it known that I, CHARLES S. TRAMELL, a citizen of the United States, residing at Pruden, in the county of Claiborne and State of Tennessee, have invented certain new and useful Improvements in Holders for Lard and Butter Trays and Like Receptacles; and I do declare the following to be a full, clear, and exact description of the invention, such as will enable others skilled in the art to which it appertains to make and use the same.

My invention relates to improvements in holders for lard and butter trays and the like and has for its primary object to provide an extremely simple yet highly effective dispensing frame or rack for the purpose of retaining flexible trays, said rack having means for preventing the removal of said trays until the latter are slightly compressed.

A secondary object of the invention is to construct the means, for preventing the removal of the trays, in the most simple manner consistent with the proper operation of the device.

With the above objects in view, the invention resides in certain novel features of construction and combination herein described and claimed and shown in the drawings wherein:—

Figure 1 is a front elevation of my improved holder showing a plurality of lard trays therein, a portion of the lower front bar being in section; Fig. 2 is a side elevation; Fig. 3 is a top plan view; Fig. 4 is a bottom plan view; and Fig. 5 is a vertical section of the device, showing one of the trays partially removed.

In the accompanying drawings, I have shown my invention as comprising an upper rectangular frame 1, a lower rectangular frame 2, upright side and rear strips 3 rigidly connecting said frames and forming guides for the trays, a removable front strip 4, and a number of stops 5 rigidly carried by the lowermost frame.

The upper frame 1 preferably comprises transverse side bars 6, a rear bar 7 connecting said bars 6 and having its opposite ends extended and perforated for the reception of attaching screws 8 and a front bar 9, said bar 9 rigidly connecting the forward ends of the side bars 6. The inner side of the front bar 9 is provided with a notched strip 10 which is rigidly secured thereto and preferably has its notch 11 centrally located for the purpose of providing an upright guideway for the removable front strip.

The lowermost frame 2 is constructed in precisely the same manner as the uppermost frame 1 with the exception that the strip 10 is omitted and a pair of upright openings 13 are formed in the upper edge of its front cross bar 12. These openings 13 are provided for the reception of studs 14 which depend from a transversely extending bar 15 which is carried rigidly by the front strip 4 and is secured thereto near its lower end.

When the parts are in assembled position, the upper end of the strip 4 is loosely retained in the notch 11 and the studs 14 project into the openings 13 thereby preventing the removal of the trays T. When however, it becomes necessary to gain access to the interior of the frame for the purpose of refilling the same with trays, it is simply necessary to raise the front strip 4 and its cross bar 15 until the studs 14 and the lower end of said strip 4 disengage the front strip 12 of the lowermost frame 2. The entire strip 4 may now be swung outwardly and its upper end disengaged from the notch 11 thereby giving access to the interior of the frame for the above stated purpose. For the purpose of facilitating the raising of the strip 4, I preferably provide the cross bar 15 with an operating handle 16.

As clearly shown in the drawings, the trays T are inverted before they are placed in the rack, this positioning preventing dust from accumulating within the same. The form of tray illustrated is formed of cardboard having reinforcing strips S preferably of metal along two of its edges. When the trays are in position in the rack, the metal strips S rest upon the stops 5, said stops being here shown in the form of inwardly extending studs 17 which are formed by bending the lower ends of wire rods 18 inwardly, the upper ends of said rods being bent outwardly to provide attaching prongs 19 which are driven through the front and rear bars of the lowermost frame 2, the major part of the lengths of said rods depending from said frame for a purpose to appear.

When it is necessary to remove one of the trays T, the first and second fingers of either the right or left hand are placed upon the inner ends of the studs 17 and inward pressure is exerted on the front metal strips S by the thumb, thus springing the sides of the tray sufficiently to allow said strip to disengage the forward pair of stops. Thus it will be seen that the trays may be quickly and easily removed without injuring the same in any way and that no mechanical means is required in the successful operation of the device.

I have described my invention as comprising an upright frame for the purpose of retaining and guiding the trays T but it will be evident that a casing could be employed to equal advantage. If the frame is employed however, it need not be constructed in the precise form illustrated in the drawings since it will operate to equal advantage if constructed of wire and provided with other guide and retaining means. In other words, I do not wish to be limited to details of construction, arrangement of parts or character of materials otherwise than as amplified in the appended claims.

Having thus described my invention, what I claim as new and desire to secure by Letters Patent is:

1. A holder for flexible trays comprising upper and lower rectangular frames, lying in lateral planes, upright strips connecting the frames, and a pair of rigid stops on the lower frame and adapted to underlie the edges of the trays, one of said strips being removable.

2. A holder for flexible trays comprising a pair of vertically spaced rectangular frames lying in lateral planes, a guide on one of the cross bars of each frame, an upright strip removably engaged with said guides, upright strips rigidly connecting said frames and rigid stops carried by the lower frame and adapted to underlie the edges of the trays.

3. A holder for flexible trays comprising a pair of vertically spaced rectangular frames lying in lateral planes, an upright guide on one of the cross bars of the upper frame, a pair of laterally spaced guides on the lower frame, an upright strip removably engaged with the guide on the upper frame and having a cross bar overlying the lower bar having the guides, studs depending from the cross bar on the strip and engaged with the guides on the lower frame, upright strips connecting said frames and rigid stops on the lower frame and adapted to underlie the edges of the trays.

4. A holder for flexible trays comprising an upright guideway, metal rods having their ends bent laterally in opposite directions, the upper ends constituting retaining studs embedded in the lower end of the guideway and the lower ends constituting stops disposed in the path of the edges of the trays.

In testimony whereof I have hereunto set my hand in presence of two subscribing witnesses.

CHARLES S. TRAMELL.

Witnesses:
 VIRGIL V. BOWDEN,
 E. J. F. DUNCAN.